US010738764B2

(12) United States Patent
Day

(10) Patent No.: US 10,738,764 B2
(45) Date of Patent: Aug. 11, 2020

(54) HIGH TORQUE, LOW RPM HORIZONTAL AXIS WIND TURBINE

(71) Applicant: Star Wind Turbines, LLC, East Dorset, VT (US)

(72) Inventor: Jason Day, East Dorset, VT (US)

(73) Assignee: Star Wind Turbines LLC, Dorset, VT (US)

( * ) Notice: Subject to any disclaimer, the term of this patent is extended or adjusted under 35 U.S.C. 154(b) by 0 days.

(21) Appl. No.: 16/094,661

(22) PCT Filed: Apr. 18, 2016

(86) PCT No.: PCT/US2016/280750
§ 371 (c)(1),
(2) Date: Oct. 18, 2018

(87) PCT Pub. No.: WO2017/184106
PCT Pub. Date: Oct. 26, 2017

(65) Prior Publication Data
US 2019/0113023 A1    Apr. 18, 2019

(51) Int. Cl.
*F03D 9/25* (2016.01)
*F03D 1/06* (2006.01)
(Continued)

(52) U.S. Cl.
CPC .............. *F03D 9/25* (2016.05); *F03D 1/06* (2013.01); *F03D 7/0224* (2013.01);
(Continued)

(58) Field of Classification Search
CPC ............ F03D 9/25; F03D 1/06; F03D 7/0224; H02K 7/1838; H02K 21/24
(Continued)

(56) References Cited

U.S. PATENT DOCUMENTS

| 4,257,740 A | 3/1981 | Duez |
| 4,439,108 A | 3/1984 | Will |

(Continued)

FOREIGN PATENT DOCUMENTS

WO    1996011337 A1    4/1996

OTHER PUBLICATIONS

Darabi, et al "Design and Simulation of Low Speed Axial Flux Permanent Magnet (AFPM) Machine", International Journal of Electrical, Computer, Energetic, Electronic and Communication Engineering vol. 6, No. 1 2012, 53-56.

(Continued)

*Primary Examiner* — Viet P Nguyen
(74) *Attorney, Agent, or Firm* — Shawn Gordon; Dunkiel Saunders Elliott Raubvogel & Hand, PLLC

(57) ABSTRACT

A horizontal axis wind turbine which includes a plurality of blades that rotate at relatively low rpms and produce a high torque to rotate a generator is described. The wind turbine provides more power at low to moderate wind speeds than conventional wind turbines, produces more power at low wind speeds while still operating at high wind speeds, begins generating power at very low wind speeds, produces less noise, and reduces animal (e.g., bird and bat) collisions. The method determines the number of blades for the wind turbine based upon the desired rpm for the wind rotor and the generator configuration is based upon the estimated torque generated by the number of blades.

22 Claims, 8 Drawing Sheets

(51) Int. Cl.
 *F03D 7/02* (2006.01)
 *H02K 7/18* (2006.01)
 *H02K 21/24* (2006.01)

(52) U.S. Cl.
 CPC .......... *H02K 7/1838* (2013.01); *H02K 21/24* (2013.01); *F05B 2220/7068* (2013.01); *Y02E 10/721* (2013.01); *Y02E 10/725* (2013.01)

(58) Field of Classification Search
 USPC ..................................................... 290/44, 55
 See application file for complete search history.

(56) References Cited

U.S. PATENT DOCUMENTS

| | | | |
|---|---|---|---|
| 5,226,805 A | 7/1993 | Proven | |
| 7,172,392 B2 | 2/2007 | Wastling et al. | |
| 7,956,482 B2 | 6/2011 | Nies et al. | |
| 8,371,813 B2 | 2/2013 | Tsai et al. | |
| 8,573,937 B2 | 11/2013 | Preus | |
| 8,702,390 B2 | 4/2014 | Sun | |
| 9,284,946 B2 | 3/2016 | Lane | |
| 9,382,897 B2 | 7/2016 | Mertens et al. | |
| 9,416,771 B2 | 8/2016 | Obrecht et al. | |
| 2003/0044274 A1 | 3/2003 | Deane et al. | |
| 2008/0150292 A1* | 6/2008 | Fedor | F03D 1/04 290/55 |
| 2010/0111668 A1* | 5/2010 | Kapich | F03D 1/04 415/47 |
| 2010/0133817 A1 | 6/2010 | Kinzie et al. | |
| 2011/0001320 A1 | 1/2011 | Lagerweij et al. | |
| 2011/0038726 A1 | 2/2011 | Elkin et al. | |
| 2011/0091325 A1 | 4/2011 | Faris | |
| 2012/0051939 A1* | 3/2012 | Marvin | F03D 1/04 416/244 R |
| 2012/0141267 A1 | 6/2012 | Kang | |
| 2012/0256422 A1 | 10/2012 | Fradella | |
| 2013/0078092 A1 | 3/2013 | Chen et al. | |
| 2013/0149161 A1 | 6/2013 | Lacasse | |
| 2014/0219799 A1* | 8/2014 | Selsam | F03D 1/065 416/11 |
| 2014/0361540 A1* | 12/2014 | Knight | F03D 80/88 290/44 |
| 2015/0110599 A1 | 4/2015 | Freda | |
| 2016/0017865 A1 | 1/2016 | Illing | |
| 2016/0097370 A1* | 4/2016 | Rodgers | F03D 1/0691 415/208.1 |
| 2016/0208781 A1* | 7/2016 | KJ R | F03D 7/0272 |
| 2018/0149134 A1* | 5/2018 | Keeley | F03D 1/04 |

OTHER PUBLICATIONS

Hertel, et al., "Passive Pitch Control of Small Horizontal Axis Wind Turbines", (2004). Passive Pitch Control of Small Horizontal Axis Wind Turbines. 10.2514/6.2004-1369. available at: https://www.researchgate.net/publication/237720591/download, Jan. 2004.

Ponta, et al., Abstract of "The adaptive-blade concept in wind-power applications", Energy for Sustainable Development, vol. 22, Oct. 2014, Oct. 2014, 3-12.

Van Kuik, et al., Abstract of "The FLEXHAT program, technology development and testing of flexible rotor systems with fast passive pitch control", Journal of Wind Engineering, vol. 39, Issues 1-3, 1992, Jan. 1, 1992, 435-448.

* cited by examiner

HIGH TORQUE, LOW RPM HORIZONTAL AXIS WIND TURBINE

RELATED APPLICATIONS

This application is a continuation-in-part of PCT Application No. PCT/US2016/028075 filed Apr. 18, 2016 and titled "High Torque, Low RPM Horizontal Axis Wind Turbine", which is incorporated by reference in its entirety.

FIELD OF THE INVENTION

This disclosure relates generally to wind turbines and especially to a High Torque, Low rpm Horizontal Axis Wind Turbine and design principles for the same.

BACKGROUND

Electrical power can be generated by many different methods, the most common involving the use of fossil or nuclear based fuels. As is known, these generating mechanisms have undesirable side effects, such as the production of toxic pollutants or reliance on dwindling natural resources. An alternative method of creating electrical power is to harness a renewable natural resource such as the wind.

A common type of wind turbine is a horizontal axis wind turbine, which typically uses two or three blades coupled together on a hub that rotates in response to a lifting force created by the wind. As used herein, the term "wind rotor" denotes the assembly that comprises a blade hub and a plurality of blades (airfoils). Generally, the wind rotor converts wind energy into the rotational energy that drives a generator. The hub is connected to a shaft that is connected to the generator, which supplies power to a load (e.g., electrical grid, residence, etc.). For certain wind turbines, a gearbox converts the rotation of the blades into a speed usable by the generator to produce electricity at a frequency that is proper for the load.

Although gear-driven wind turbines are still being made and used, direct-drive wind turbines are becoming more prevalent largely due to advances in systems for controlling this type of wind turbine. As its name implies, direct-drive wind turbines do not include a gearbox, but rather have a direct mechanical coupling between the wind rotor and generator so that the wind drives the wind rotor and the rotor within the generator together as a unit. Direct-drive wind turbines have an important advantage in lessened complexity, which typically results in direct-drive wind turbines being more reliable, and having longer life spans and lower costs of operation than their gear-driven counterparts.

Current wind turbine designs are focused on developing maximum power, which typically means designing a wind turbine that makes peak power at relatively high wind speeds (e.g., 24 and over miles per hour (mph) or 80-100% more than the average wind speed), using a high rpm generator. The need for high wind speeds means that these wind turbines are sited on ridgelines or other consistently windy areas, which are not desirable in many communities or even available as the vast majority of the population of the world lives in areas below 11 mph (5 m/s). In operation, the blades of these wind turbines have tip speeds that induce significant noise and result in animal (e.g., bird and bat) collisions. And lastly, the coefficient of power (Cp) (also referred to as the capacity factor) at less than peak power wind speed for wind turbines is poor because the design of the wind turbine causes it to operate inefficiently at less than the peak power wind speed. This design methodology also results in an additional cost to electrical systems because of the need for higher capacity transmission lines to accommodate the higher voltage that these turbines intermittently produce.

SUMMARY OF THE INVENTION

In a first exemplary aspect, a horizontal axis wind turbine is configured to rotate at a desired maximum tip speed, the wind turbine comprising a plurality of blades, wherein the number of the plurality of blades is at least 5 and the number of the plurality of blades is determined as a function of blade length and a time tip interval; and a permanent magnet generator having a plurality of rotor assemblies and stator assemblies, wherein the number of the plurality of rotor assemblies and stator assemblies is determined as a function the torque producible by the plurality of blades and the desired maximum tip speed.

In another exemplary aspect, a wind turbine for generating power in low wind conditions is disclosed, the wind turbine comprising: a tower, a nacelle rotatably coupled to the tower; a permanent magnet generator disposed within the nacelle, the permanent magnet generator having a plurality of rotor assemblies and a plurality of stator assemblies; a wind rotor coupled to the permanent magnet generator via a shaft, wherein the wind rotor includes a plurality of blades and a rotor hub, and wherein the number of the plurality of blades is at least 5 and the number of the plurality of blades is determined from a blade length and a time tip interval associated with a desired maximum tip speed of the wind rotor, and wherein the number of the plurality of rotor assemblies and stator assemblies is determined from the torque producible by the plurality of blades and the desired maximum tip speed. In an embodiment, the permanent magnet generator is tuned to have a peak power output at winds of about 17 mph (7.7 m/s).

In yet another exemplary aspect, a method of designing a horizontal axis wind turbine comprises: determining a desired tip speed; determining a wind rotor diameter; specifying a desired maximum rpm for the wind rotor; determining a maximum tip speed from the desired maximum rpm; determining a number of blades for the wind turbine, wherein the number of blades is at least 5; estimating a torque producible by the number of blades; and sizing a generator to produce a desired power output at the desired maximum rpm based upon the estimating. In an embodiment, the time tip interval is determined from the desired tip speed and the wind rotor diameter.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DESCRIPTION OF THE DISCLOSURE

A high torque, low rpm horizontal axis wind turbine according to the present disclosure produces more power at low wind speeds while still operating at high wind speeds, begins generating power at very low wind speeds, produces less noise, and reduces animal (e.g., bird and bat) collisions. A wind turbine apparatus designed as disclosed herein can also generate more energy per name plate peak value, than a conventional 3-blade wind turbine having the same wind turbine rotor configuration, i.e., same blade airfoil and same blade length (and thus having the same swept area).

A wind turbine according to the present disclosure is preferably designed (also referred to herein as "tuned") to generate peak power between 15 and 18 mph and preferably at about 17 mph (7.7 m/s) or less. In an embodiment, the wind turbine includes articulating blades so as to assist with constant rpm control, which allows the wind turbine to operate at higher wind speeds (i.e., wind speeds above about 17 or 18 mph (7.7 m/s). A wind turbine according to the present disclosure, operates such that the blade tip speed is lower than a conventional turbine with a high rpm generator at the same wind speed and thus, less noise is generated by the blades and the possibility for avian/bat collisions is more unlikely. A wind turbine according to the present disclosure includes more than 4 blades, which enables the blades to catch the air (and thus the resulting energy provided by the moving air) that would escape between the blades of conventional two or three blade turbine designs.

Figure 1:
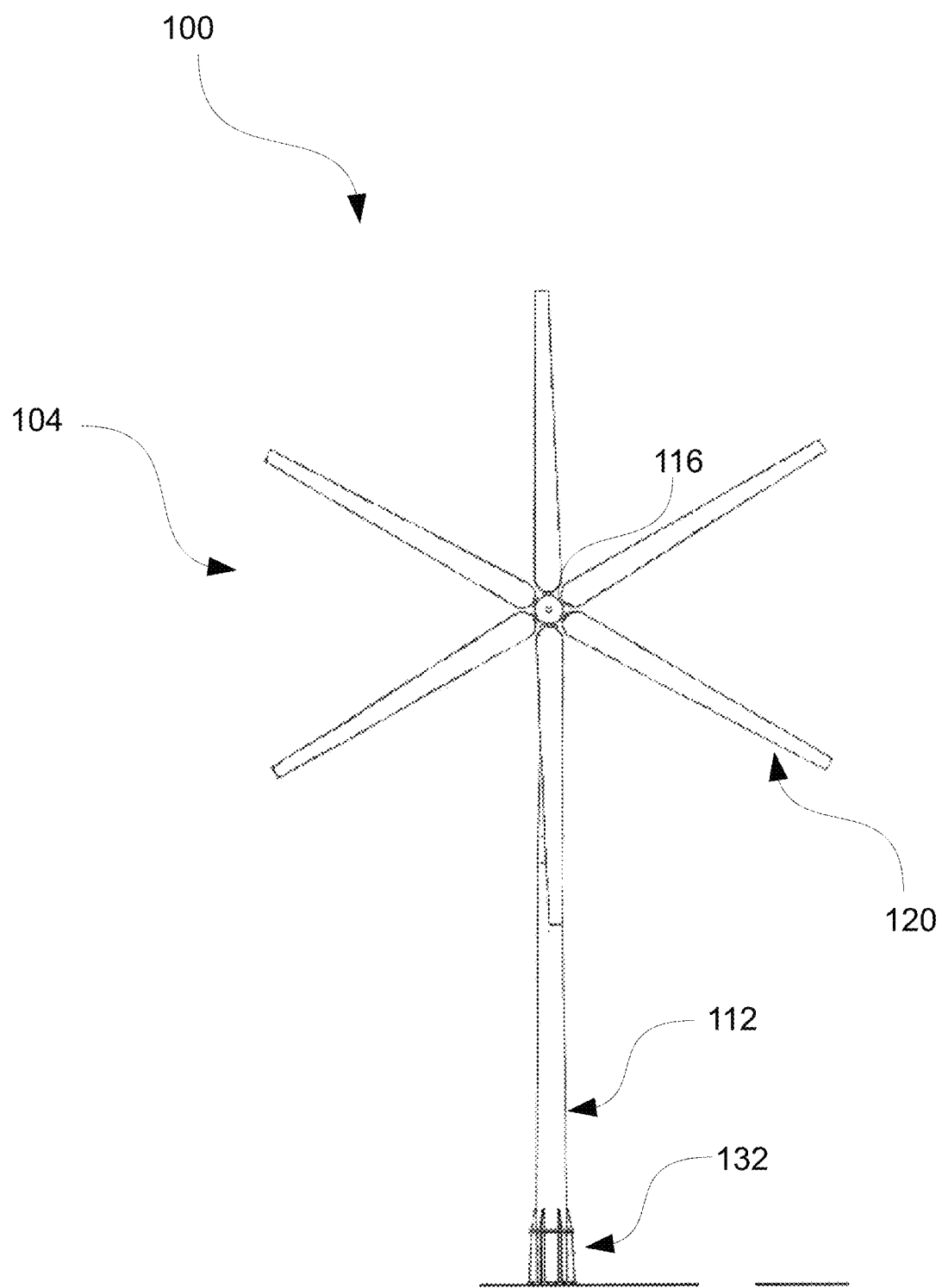
FIG. 1 is an elevated isometric view of a wind turbine according to an embodiment of the present invention.
Figure 2:
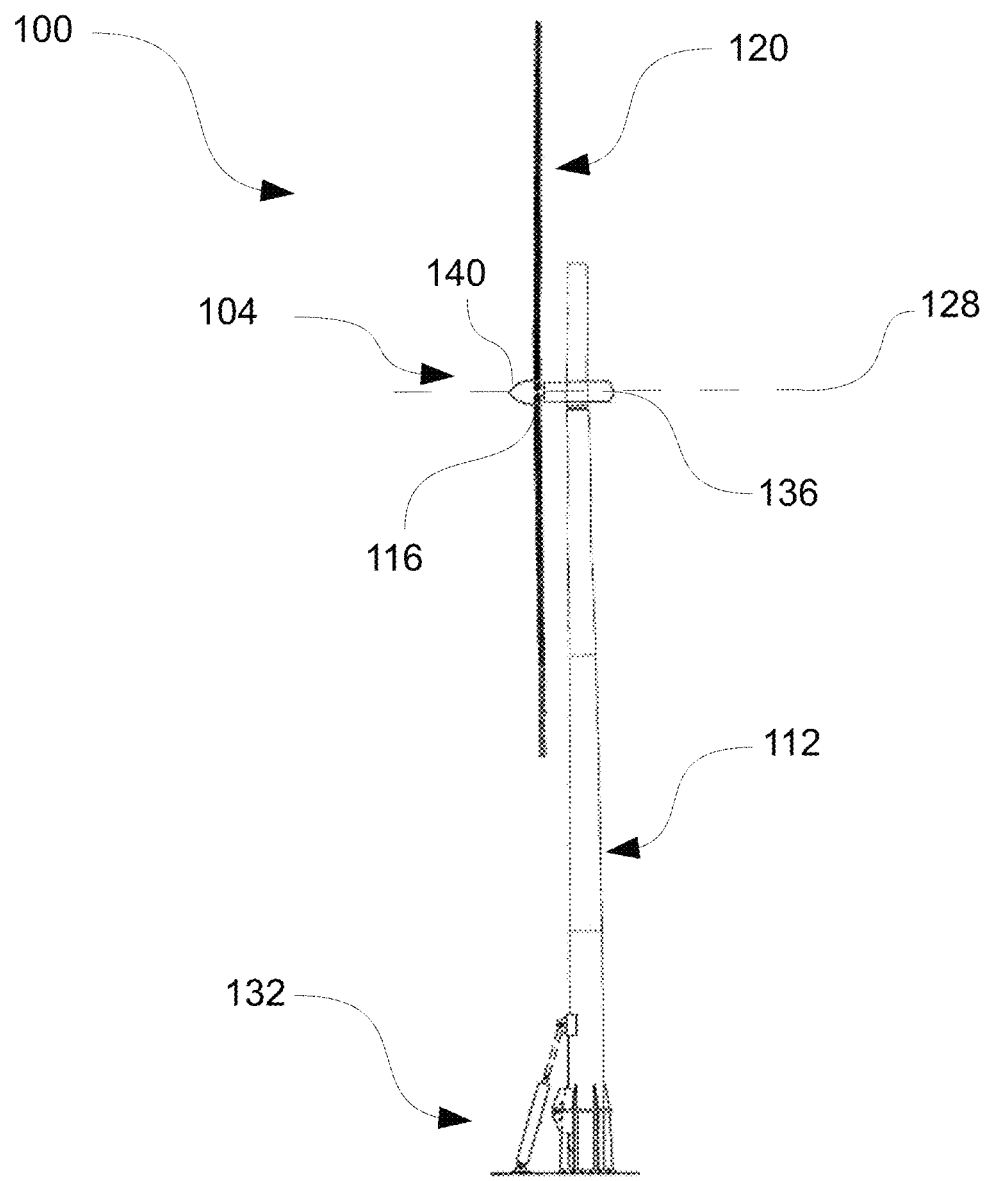
FIG. 2 is a side elevated isometric view of the wind turbine of FIG. 1.

Increased regulation (federal, state, and local) of wind turbines is placing increased pressure on wind turbine designs to operate better (e.g., quieter, safer, more reliably, with greater power output, etc.) and a wind turbine designed according to the current disclosure can meet limitations of power production in low to moderate winds, a peak power limit, a noise limit, a tower height, and a horizontal tower load. A wind turbine according to the present disclosure can make more power in kWh/year, with reduced noise, a reduction of animal (e.g., avian and bat) collisions, and a reduction in the capacity factor or need for heavier transmission lines, than a conventional 3-blade high rpm wind turbine subject to the same peak power, tower, and noise limits. A wind turbine according the present disclosure is more efficient for a grid operator and/or a community given the more consistent power production As shown in FIGS. 1 and 2, there is a high torque, low rpm wind turbine (hereinafter "wind turbine") 100 according to certain embodiments of the present disclosure. Wind turbine 100 generally includes a wind rotor 104, a generator 108 (shown in FIG. 4), and a tower 112. As discussed below in more detail, wind turbine 100 includes a number of features that provide improvements over conventional wind turbines. These improvements generally relate to improved operation at lower wind speeds and the ability to maintain low rpms at high wind speeds.

Figure 3:
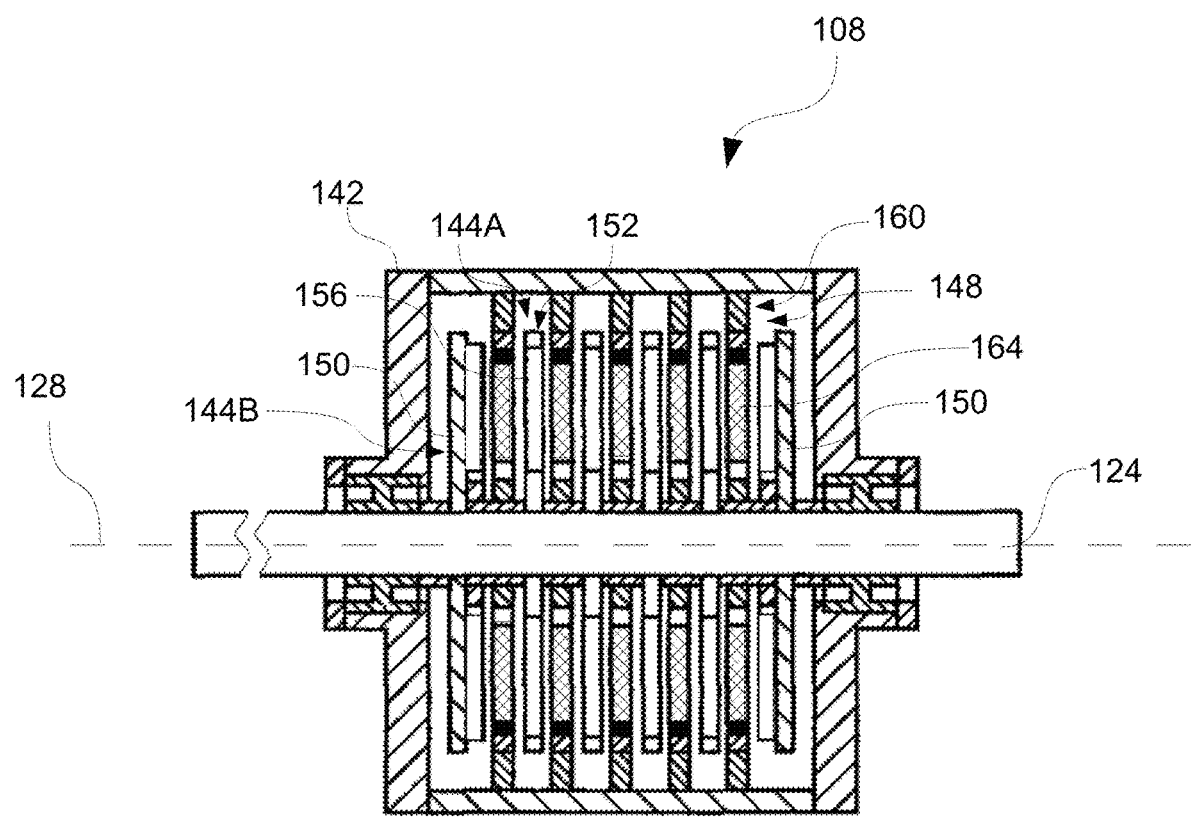
FIG. 3 is a cutaway plan view of a permanent magnet generator according to an embodiment of the present invention.

Wind rotor 104 includes a rotor hub 116, a plurality of blades 120, and a shaft 124 (best seen in FIG. 3). Blades 120 are coupled to rotor hub 116 and extend generally radially outward from a rotational axis 128. Rotor hub 116 is coupled to shaft 124, which is coupled to portions of generator 108. Blades 120 include a profile that assists in generating lift forces on the blade so that rotor hub 116 rotates. In certain embodiments, wind turbine 100 may include a pitch control mechanism (not shown, but described in more detail below) that would facilitate the altering of the attack angle of blades 120 so as to produce energy efficiently at varying wind speeds or to preserve the integrity of the wind turbine. While the blades may be made of any suitable material, typically a fiberglass reinforced vinyl ester or epoxy is used to reduce weight while still providing the mechanical strength required to withstand wind loads. As discussed further herein, the length and number of blades 120 are determined based upon a number of factors set forth in exemplary processes 400 (FIG. 7) or process 500 (FIG. 8). In an exemplary embodiment, the preferred number of blades 120 can be determined by using the ratio of the TSR (tip speed ration) to the TTI (Tip to Tip Interval). In exemplary embodiments the number of blades 120 is greater than 5. In another exemplary embodiment, the number of blades 120 is between 6 and 8 blades. During operation of wind turbine 100, wind rotor 104 is driven by the wind to rotate and supply a useful torque through rotor hub 116 to generator 108 via shaft 124.

Wind rotor 104 may be positioned above the ground by a tower 112 having a height suitable for the intended application. Considerations in selecting the height of tower 112 include, among other things, the distance from the tips of blades 120 to their rotational axis and the proximity and characteristics of surrounding structures, geographic features or the like, that may affect the wind impinging upon wind rotor 104. In an exemplary embodiment, tower 112 is a tapered tubular steel structure that is constructed in sections to facilitate the transportation and assembly of the tower at its point of use. Alternatively, the tower may be made from a lattice structure or from concrete sections, as is known in the art. As shown in embodiment shown in FIG. 2, tower 112 includes a lift assembly 132 that allows the tower to be raised and lowered for maintenance. In an exemplary embodiment, lift assembly 132 is a hydraulic lift assembly that allows tower 112 and wind rotor 104 to move from a substantially horizontal orientation to a substantially vertical orientation.

As seen in FIG. 2, wind rotor 104 may be supported on tower 112 via a nacelle 136 that may be rotatably attached to the tower by a yaw bearing assembly (not shown) that allows the nacelle and wind rotor to rotate toward the prevailing winds (or away from the prevailing winds in the case of a desired shut-down or reduced power operation). Wind rotor 104 also includes a nose cone 140 that is secured to rotor hub 116 and/or one or more of blades 120. Nacelle 136 is typically sized to enclose generator 108 and other components of wind turbine 100, such as, but not limited to, power converters, control systems, etc.

Turning now to FIG. 3, there is shown an exemplary generator 108 suitable for use with wind turbine 100. In an exemplary embodiment, generator 108 is a permanent magnet generator that includes a housing 142, a plurality of rotor assemblies 144 and a plurality of stator assemblies 148. Rotor assemblies 144 are shown in two forms in FIG. 3, rotor assemblies 144A and rotor assemblies 144B. Rotor assemblies 144A each include a rotor plate 152 and a plurality of permanent magnets 156 embedded therein. Rotor assemblies 144B include a yoke 150 and a plurality of permanent magnets affixed thereon. Each stator assembly 148 includes a stator plate 160 and a plurality of stator coils 164.

In the embodiment shown in FIG. 3, generator 108 is made of an alternating assembly of alternating rotor assemblies 144 and stator assemblies 148, with each rotor assembly being coupled to shaft 124. Each rotor plate 152 and yoke 150 supports a circular array of alternated pole axial-field permanent magnets 156 attached thereon. Yokes 150 also provide a return path for the magnetic fields of permanent magnets 156 and can be formed of high magnetic permeability materials. Rotor plates 152 are typically non-magnetic and have low magnetic permeability so as to maximize flux density between the rotor plates. The stator plates 160 can be molded with the stator coils 164 and composed of a material that is electrically non-conductive and that has high thermal conductivity so that heat generated by current in the stator coils is conducted to the stator plate.

The design of generator 108 makes it possible to increase the number of the magnetic poles created by the permanent magnets disposed on each rotor assembly 144 by increasing the size of rotor plate 152. For generator 108, the polarity of the magnets is oriented in the axial direction, with adjacent permanent magnets 156 disposed so as to have opposing polarities. Generally, increasing the number of permanent magnets has the effect of increasing the power output of the generator as well as increasing the torque required to turn the rotor assembly. Similarly, an increase in the number of stator coils 164 increases the power output of the generator while increasing the torque required to turn the rotor assembly.

Figure 4:
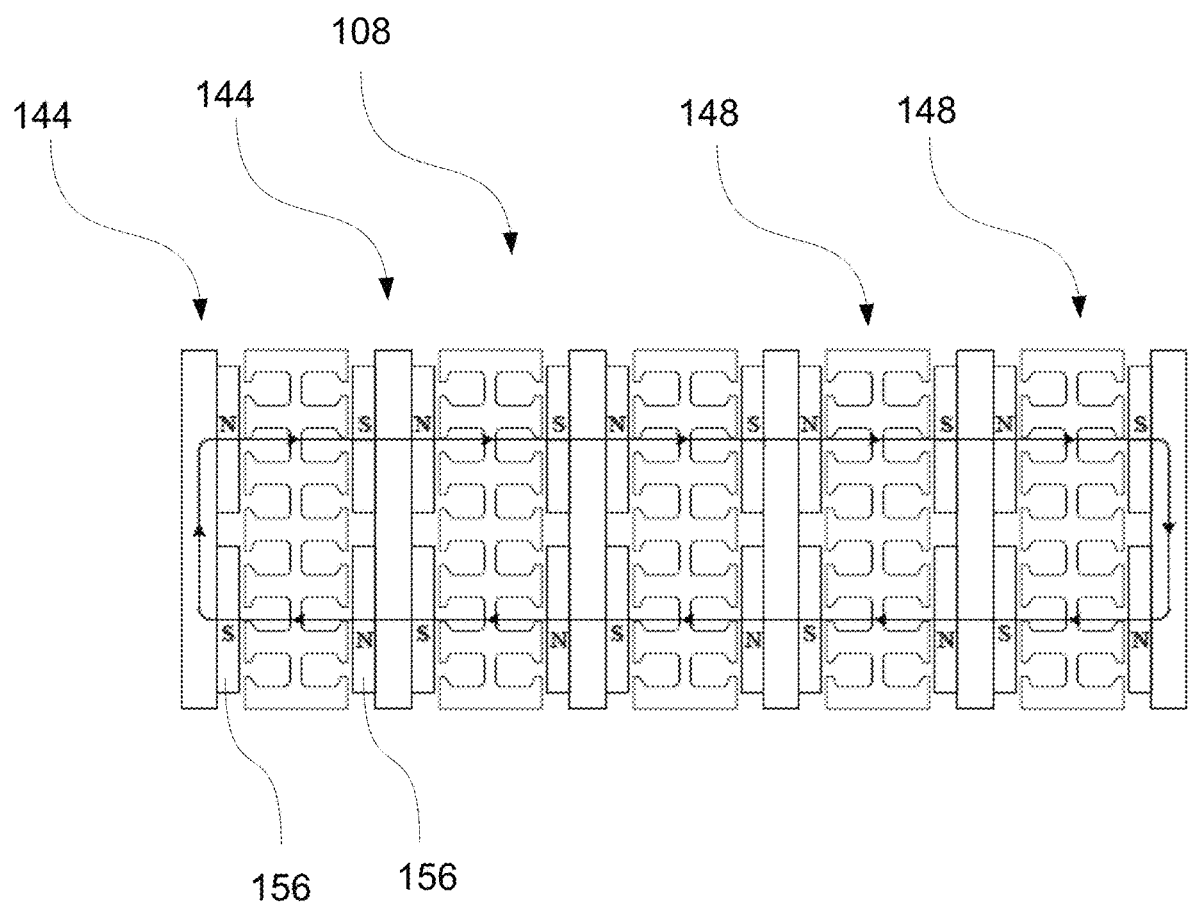
FIG. 4 is an illustration of the flux path of the permanent magnet generator of FIG. 3.

FIG. 3, shows six rotor assemblies 144 with permanent magnets 156 embedded in rotor plate 152. The polarity of permanent magnets 156 on the rotors may have the same arrangement in all the rotors, e.g., an N-pole magnet of one rotor and a permanent magnet of another rotor in a directly opposed position may be both N-pole magnets, resulting in a mutual enhancement of the magnetic field generated in the gaps between the rotors. In an embodiment of generator 108, and as shown in FIG. 4, permanent magnets 156 on adjacent rotors are set in an opposing relationship. The arrangement of permanent magnets 156 in this type of relationship and the magnet pathways generated thereby is discussed in more detail in "Axial Flux Permanent Magnet Disc Machines: A Review", by Aydin, M., S. Huang, T. A. Lipo, published by the Wisconsin Electric Machines & Power Electronics Consortium, 2004.

In general, the number of rotor assemblies 144 and stator assemblies 148 affects the electrical generation capacity of generator 108, i.e., the more assemblies there are, the more power will be generated by generator 108 at a given wind rotor angular speed. Concomitantly, an increase in the number of rotor assemblies 144 and stator assemblies 148 also requires increased torque transmitted by wind rotor 104 in order to achieve a given wind rotor angular speed. Accordingly, the number of stages (e.g., a set of rotor assemblies 144 and stator assemblies 148) selected for use in generator 108 (which can be any number) and/or the number of stator coils 164 and permanent magnets 156, as well as the construction and configuration of the coil windings, can be chosen so as to maximize the power output for a desired wind rotor 104 speed, also referred to herein as "tuned".

Figure 5A:
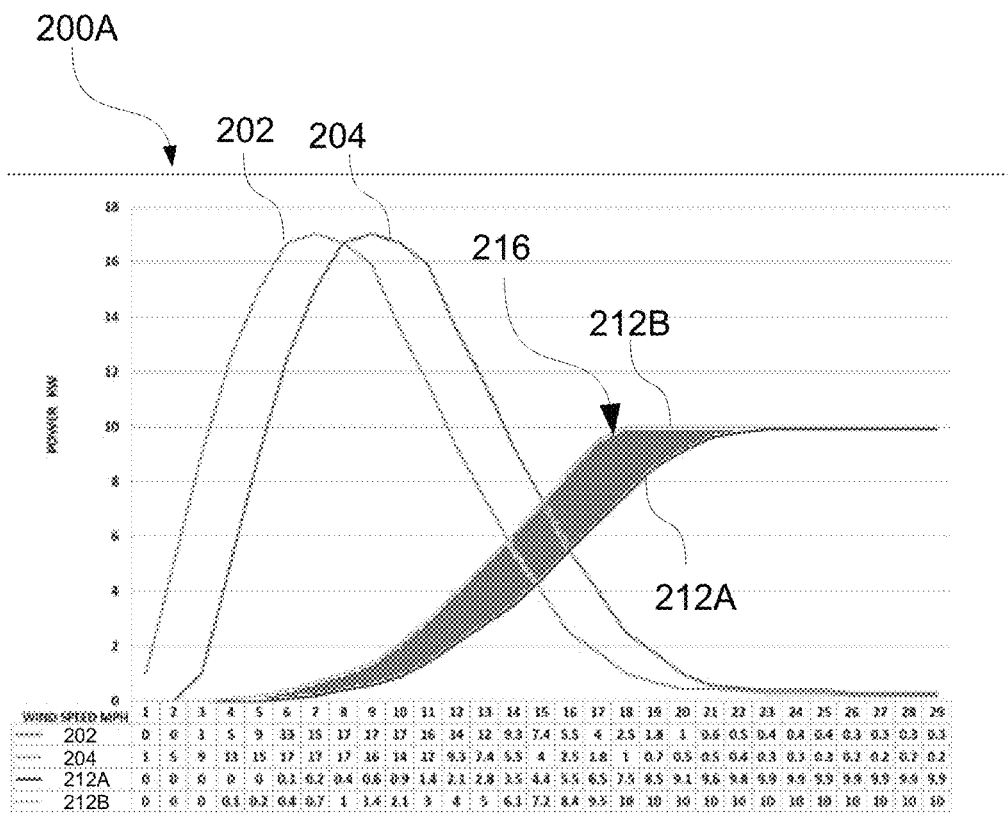
FIG. 5A is a graph of power versus wind speed for a conventional wind turbine and a wind turbine according to an embodiment of the present invention, where both turbines have the same maximum power output.

Turning now to FIG. 5A, there is shown a graph 200A of power (kW) versus wind speed (mph). Curves 202 and 204 are predictive models of wind speed for a given average wind speed. Specifically, curve 202 is a prediction of wind speed frequency for an average wind speed of 4 mph and curve 204 is a prediction of wind speed frequency where the average wind speed is 5 mph. As shown in FIG. 5A, the average wind speed of 4 mph (curve 202) peaks at a frequency of 7 mph. At the average wind speed of 5 mph (curve 204), the wind speed frequency for faster wind speeds increases, but still peaks at about 11 mph. It is worth noting that the average wind speed for the western, eastern, and southern portions of the U.S. is about 11 mph and thus curve 204 is roughly predictive of the average winds of a significant portion of the U.S. The table below graph 200A shows the data used to generate the curves.

Graph 200A also shows two wind turbine power curves, curves 212A and 212B, which represent power curves for a conventional wind turbine (curve 212A) and a wind turbine configured as described herein, such as wind turbine 100 (curve 212B). Specifically, the wind turbine that produces curve 212B has six blades and produces maximum power at about 17 to 18 mph wind speeds. The wind turbine producing curve 212A has three blades and makes its maximum power at 22 mph. Comparing the two curves reveals that the two turbines produce the same power output at high wind speeds; however, at lower wind speeds, a turbine having power curve 212B, makes more power and rotates at lower rpms, at a given wind speed, than the conventional turbine. More specifically, graph 200A shows that an embodiment of a wind turbine configured as described herein following curve 212B makes power a higher percentage of the time due to the earlier cut in speed and increased power capture at lower wind speeds, which are closer to the average wind speeds. The additional power produced by a wind turbine with power curve 212B is shown by shaded region 216. Taking into consideration that at an average wind speed of 5 mph wind speeds greater than 18 mph are relatively rare, the amount of additional power generated by a wind turbine having curve 212B is quite large.

At a high level, the principle of design used to develop a wind turbine such as wind turbine 100 that has a power curve similar to 212B is one of maximizing and using the torque available from the lift of blades 120 to produce electricity at comparatively higher values in low to moderate wind speeds (less than about 18 mph).

Additionally, with the use of pitch control systems, such as those described in U.S. patent application Ser. No. 12/906,100, filed Dec 3, 2010, and titled "Wind turbine blade automatic pitch control using centrifugal force," which is incorporated by reference for its discussion of the same, the wind turbine can maintain its power output (flat line region for curve 212B) while it is safe to do so. In another exemplary embodiment, pitch control is implemented using an electro-mechanical method. In another exemplary embodiment, blades 120 can be fixed pitch type. In an exemplary embodiment, the aerodynamic design of the fixed-pitch blades causes stall at higher wind speeds so as to reduce lift, thereby reducing the rotation of the wind rotor.

Figure 5B:
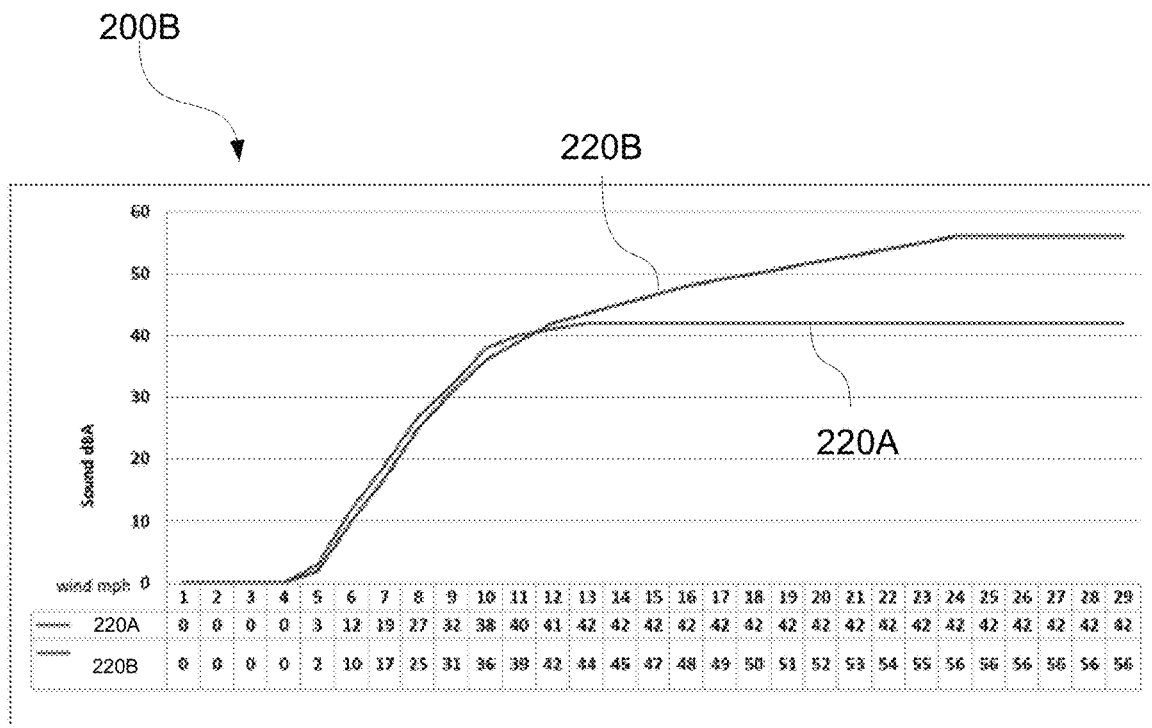
FIG. 5B is a graph of sound versus wind speed for the wind turbines shown in FIG. 5A.

Also, as noted above, a wind turbine having a power curve 212B will produce less noise than a conventional wind turbine having a power curve 212A when producing maximum power. FIG. 5B shows a graph 200B of sound (dBA) versus wind speed and has a curve 220A, which represents the sound output of the wind turbine producing curve 212B (such as wind turbine 100 discussed herein) and a curve 220B, which represents the sound output of the wind turbine producing curve 212A, i.e., a conventional three-bladed turbine. As shown, while curve 220A shows a slightly louder wind turbine (due to the presence of the extra blades), at about 11 mph, the conventional wind turbine begins to make more noise due to the tip speed of its blades. As is known, noise is a function to the 5th order of the wind velocity and increases exponentially as the wind increases. Thus, the lower tip speeds produced by a wind turbine with power curve 212B (FIG. 5A), results in a substantially quieter wind turbine when producing power at modest (11 mph) and higher wind speeds. In particular, when comparing the conventional turbine producing power curve 212A with a wind turbine as described herein producing power curve 212B, the conventional turbine will have a maximum sound output of about 55 dBA, while the other will have a maximum sound output of 42 dBA.

Figure 6:
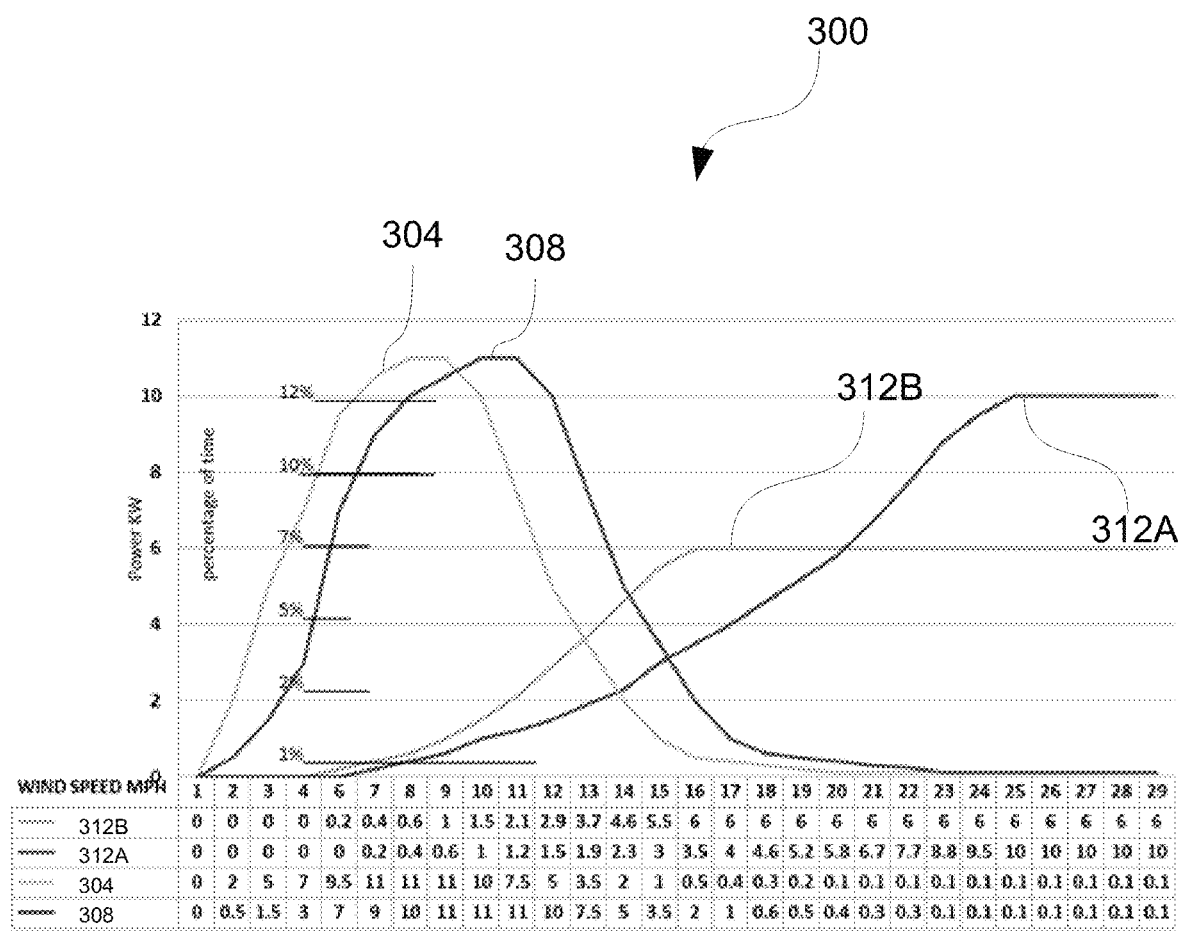
FIG. 6 is a graph of power output versus wind speed for a conventional wind turbine and a wind turbine according to an embodiment of the present invention, where the conventional wind turbine has a greater maximum power output.

FIG. 6 is a graph 300 of power output as a function of wind speed (mph) comparing two wind turbines against each other (one conventionally designed producing power curve 312A (hereinafter "conventional turbine") and one designed according to an embodiment of the present disclosure producing power curve 312B (hereinafter "low rpm turbine") and the Weibull probability curves at 4 m/s (curve 304) and 5 m/s (curve 308). The conventional turbine has 3 blades, is tuned to produce 10 kW peak power at 25 mph where it will rotate at 250 rpm, and will produce about 55 dBA of sound at peak. This turbine would produce about 14,000 kWh/year in an area with a 5 m/s average wind. The low rpm turbine, producing curve 312B, has 6 blades and is tuned to produce 6 kW peak power at 16 mph winds. At peak, it will rotate at 120 rpm and produce 42dBA of sound. It will produce about 18,000 kWh/year in a 5 m/s average wind speed area. The low rpm turbine cuts-in at a lower wind speed and produces more power more often than the conventional turbine. Specifically, the low rpm turbine makes its peak power at about 16 mph which happens about 7% of the time compared to conventional turbine which makes its peak power at 25 mph which happens less than 1% of the time. It can also be observed that the low rpm turbine makes more energy with a lower peak power which improves the Cp efficiency of peak power to yearly energy produced.

In terms of power production, if the turbines are placed in an area with winds averaging 5 m/s (curve 308) the conventional turbine will generate about 14,000 kWh yearly, whereas the low rpm turbine will generate almost 20% more (around 18,000 kWh yearly). If the average wind speed is lower, such as 4 m/s (curve 304) the gap between the two turbines increases. The table shown below graph 300, provides the power output data supporting the graph. An apparent benefit of the low rpm wind turbine is the early cut in speed and the quick ramp up to maximum power output, which, as stated before, is facilitated by increasing the number of properly airfoiled blades and providing a low rpm generator. In an exemplary embodiment, the airfoil of the blades is designed to give more lift at a lower tip speed and low rpm. Additionally, and as discussed herein, the use of feathering or pitching of the blades allows the low rpm generator to continue to make maximum power at wind speeds above the peak power wind speed. As is evident from graph 300, while the low rpm turbine generators have a lower peak power, overall, more power is produced at lower wind speeds.

Figure 7:
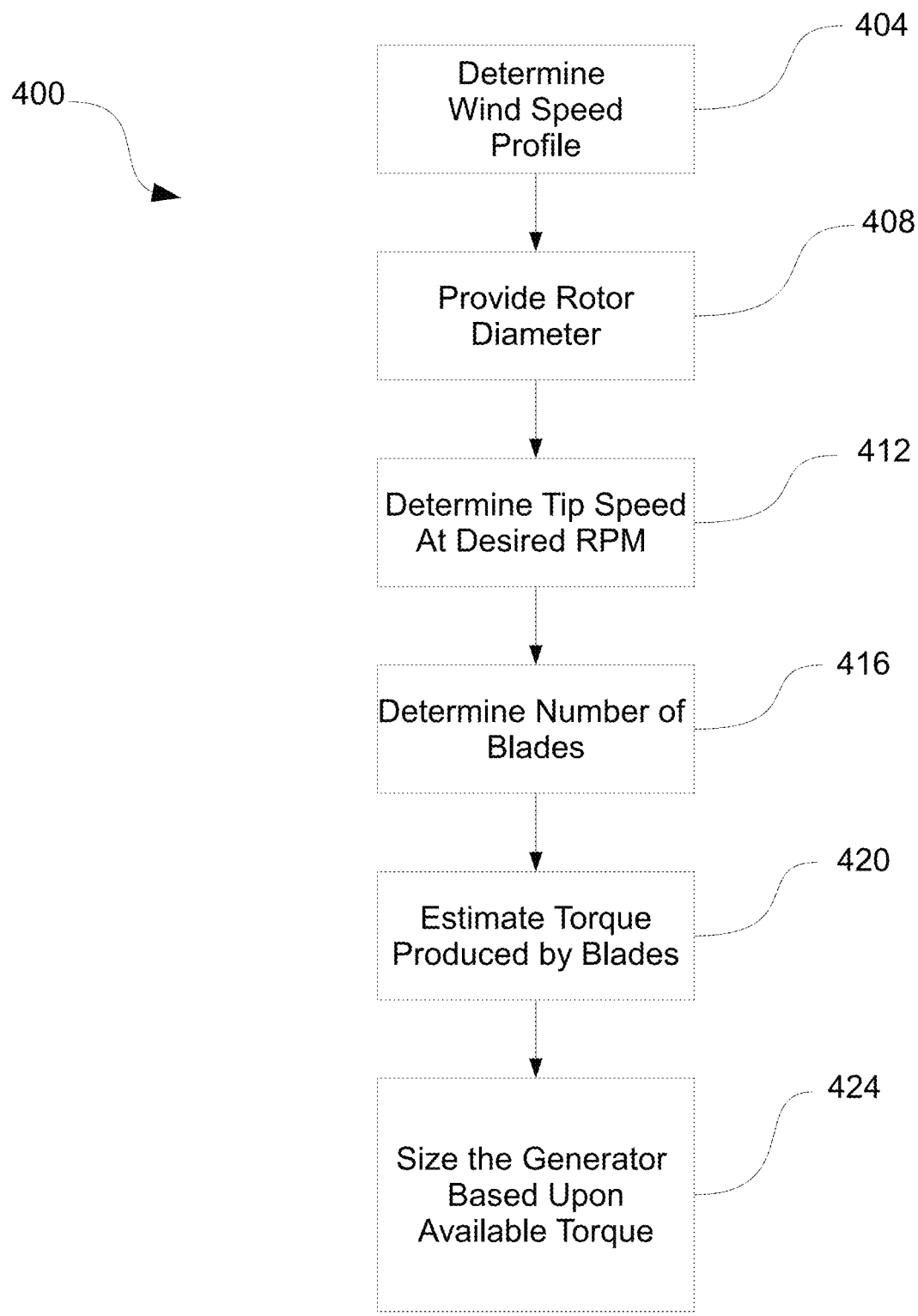
FIG. 7 is a process diagram of an exemplary method of designing a high torque, low rpm wind turbine according to an embodiment of the present invention.
Figure 8:
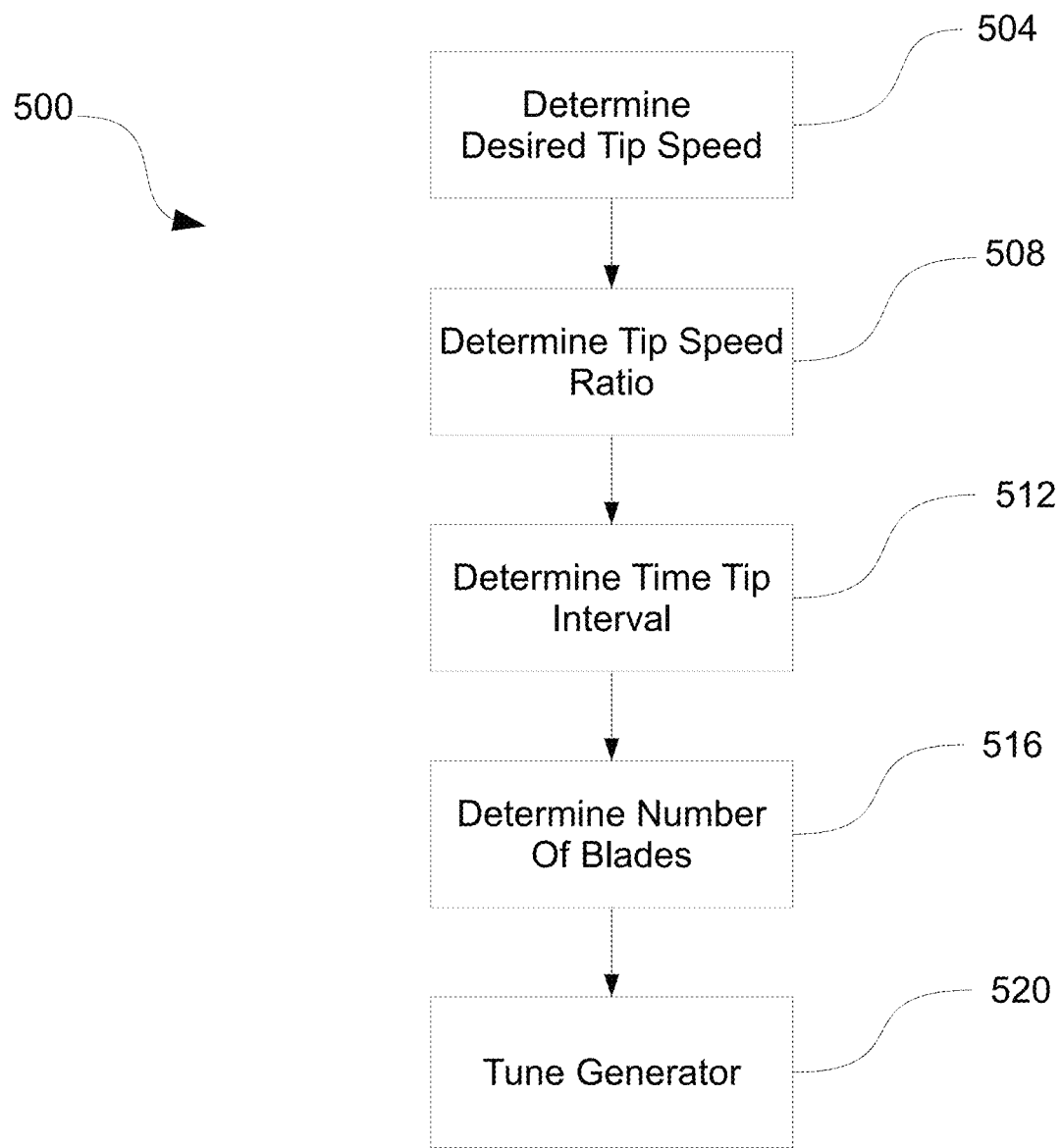
FIG. 8 is a process diagram of another exemplary method of designing a high torque, low rpm wind turbine according to an embodiment of the present invention.

FIG. 7 shows an exemplary design process 400 suitable for developing a wind turbine, such as wind turbine 100. At step 404 a wind speed profile is determined. In an exemplary embodiment, the wind speed profile is developed by monitoring the wind conditions over a period of time at the location the wind turbine is to be sited. The monitoring can be configured so as to evaluate the wind speed at the proposed height of the turbine so as to improve the accuracy of the expected wind speeds over time. In another embodiment, predetermined wind speed profiles may be used based upon an average wind speed. For example, if the site for the wind turbine has an average wind speed of about 5 mph, curve 204 (FIG. 5A) may be used as the wind profile.

At step 408, a wind rotor diameter is determined. As mentioned above, the size of the wind rotor is a function of the site, e.g., the height of the wind turbine tower, tower support pad sizing and type, the location of impediments to wind flow (e.g., trees, homes, buildings, etc.), and other variables known to persons of ordinary skill in the art.

At step 412, the projected tip speed at a desired rpm of the wind rotor is calculated. Tip speed=$\pi$D*rpm, where D is the diameter of the wind rotor determined at step 408.

Based, at least in part, on the tip speed determined at step 412, the number of blades suitable for the installation can be developed at step 416. In general, the number of blades for a wind turbine designed as described herein is the maximum number of blades that can be installed such that each blade has "clean wind." As each blade rotates in response to the wind, the wind impacting the blade and the wind behind the trailing edge of the blade has had its trajectory changed (sometimes referred to as turbulence) such that it can negatively impact the leading edge of the next blade and the performance of the wind turbine. Clean wind is wind that is free from these previously mentioned trajectory changes and the amount of clean wind varies significantly with the tip speed and rotor diameter—in other words, the faster the blades travel the more space is needed between blades to assure that each blade has clean wind. In addition to tip speed, a number of other factors will be important in determining the appropriate number of blades including, but not limited to, blade profile, blade width, blade length, the implementation of pitch control, etc. In general, and contrary to the great majority of wind turbines currently in use, the number of blades used will be greater than 3. In an exemplary embodiment, the number of blades is greater than or equal to 5.

At step 420, an estimation of the torque producible by the wind turbine with the specified number of blades is developed. The torque is a function of, among other things, wind density, average wind velocity, blade sweep area, and the number of blades.

The estimated torque and the desired rpm are then used to determine the configuration of the electrical generator, such as generator 108, used to generate electricity at step 424. In an exemplary embodiment, the electrical generator is a permanent magnetic generator that includes a series of rotor assemblies and stator assemblies, such as those described above with reference to generator 108. The number of assemblies employed is proportional to the torque producible by the wind turbine and the desired power output. In a preferred embodiment, the configuration of the generator is such that the resultant wind turbine is a high-torque, low rpm wind turbine that begins producing power at relatively low wind speeds, produces more power than conventional wind turbines at moderate wind speeds, produces low noise, and reduces bird and bat collisions.

Turning now to FIG. 8, there is shown another exemplary process, process 500, for designing a wind turbine, such as wind turbine 100.

At step 504, a desired tip speed is determined. The tip speed of a wind turbine blade is a function of blade length and the speed of rotation of the rotor. The desired tip speed may be determined, for example, by identifying a desired noise output of the turbine at the maximum rotor rotation. In an exemplary embodiment, the noise output desired is a noise value that is less than about 44 dBA at 200 ft. In another exemplary embodiment, the noise output desired is a noise value that is below the "noise elbow". The "noise elbow" is a portion of a dBA versus rpm curve that shows the rpm where resonances start and the noise value begins to increase exponentially as a function of rpm increase. Generally, it is believed that that the rpm at the beginning of the "noise elbow" is always below the rpm where a conventional wind turbine would make its best power. The tip speed can be determined using models that use the desired noise output and other variables, such as, but not limited to, turbine tower height, blade length, etc., to determine the rpm that will produce the desired noise output.

At step 508, the tip speed ratio (TSR) is established. TSR is the ratio between the speed of the tip of a blade and the velocity of the wind passing the blade. The speed at the tip of the blade can be determined from the blade length and tip speed (which also gives the max rpm) found in step 508. The wind velocity of the wind at the blade tip can be equal to the maximum expected velocity experienced by the blade prior to any feathering by a blade pitch system.

At step 512, with the max rpm established, the process then determines the time tip interval (TTI). TTI is the distance and time between two blade tips of a rotating wind turbine, typically measured in inches/sec. The TTI is determined from the tip speed velocity and the diameter of the rotor, which allows for an estimation of the turbulence zone—the area of turbulent air trailing a passing blade—created by each blade. The amount of distance/time needed for the turbulent zone to clear for the next blade such that the trailing blade has "clean wind" (as discussed above) is the desired TTI.

At step 516, the number of blades for the wind turbine is determined. The number of blades is a function of the TSR, blade length, solidity, and the TTI. In an exemplary embodiment, blades are incrementally added to the rotor until the desired TTI is achieved. Importantly, it should be noted that as blade length increases and tip speed held constant (thus leading to a decrease in rpm), the TTI increases and therefore additional blades can be inserted.

At step 520, the generator is tuned to correspond with the torque and rpm of the wind rotor. As discussed above, the torque required to turn a generator rotor, for a direct drive generator, is a function of the number of poles (rotor or stator) and/or number of rotor/stator assemblies.

Among the advantages of a wind turbine as designed via an exemplary method disclosed herein is lower noise at maximum speed, more power generation at lower speeds, reduced bat and avian collisions, and reduction in the peak power output while still producing equivalent annual energy output so as to avoid taxing electricity distribution infrastructure.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A horizontal axis wind turbine configured to rotate at a desired maximum tip speed, the horizontal axis wind turbine comprising:
   a plurality of blades, wherein the number of the plurality of blades is at least 5 and the number of the plurality of blades is determined as a function of blade length and a time tip interval, wherein the time tip interval is the distance and time between two blade tips of a rotating wind turbine; and
   a permanent magnet generator having a plurality of rotor assemblies and stator assemblies, wherein the number of the plurality of rotor assemblies and stator assemblies is determined as a function the torque producible by the plurality of blades and the desired maximum tip speed.

2. A wind turbine according to claim 1, wherein the wind turbine has a cut-in speed of less than 5 mph (2.2 m/s).

3. A wind turbine according to claim 1, wherein the number of the plurality of blades is greater than 5 and less than 12.

4. A wind turbine according to claim 1, wherein the permanent magnet generator is an axial generator.

5. A wind turbine according to claim 1, wherein the permanent magnet generator is a radial generator.

6. A wind turbine according to claim 1, wherein the permanent magnet generator produces a maximum output at about 17 mph.

7. A wind turbine according to claim 6, wherein at about 75 rpm, an output of the permanent magnet generator is at least 10 kW peak power at about 17 mph wind speed.

8. A wind turbine according to claim 1, wherein the plurality of blades rotate at a desired maximum tip speed of about 90 mph.

9. A wind turbine according to claim 1, wherein the number of the plurality of blades is 6 and wherein at about 110 rpm, an output of the permanent magnet generator is at least 5 kW peak power at less than a 17 mph wind speed.

10. A wind turbine according to claim 1, wherein the number of the plurality of blades is 6 and wherein at about 36 rpm, an output of the permanent magnet generator is at least 25 kW peak power at less than a 17 mph wind speed.

11. A wind turbine according to claim 1, wherein the number of the plurality of blades is 6 and wherein at about 52 rpm, an output of the permanent magnet generator is at least 15 kW peak power at less than a 17 mph wind speed.

12. A wind turbine according to claim 1, further including a variable pitch system.

13. A wind turbine according to claim 1, wherein the maximum tip speed is less than 100 mph.

14. A wind turbine for generating power in low wind conditions, the wind turbine comprising:
   a tower;
   a nacelle rotatably coupled to the tower;
   a permanent magnet generator disposed within the nacelle, the permanent magnet generator having a plurality of rotor assemblies and a plurality of stator assemblies;
   a wind rotor coupled to the permanent magnet generator via a shaft, wherein the wind rotor includes a plurality of blades and a rotor hub, and wherein the number of the plurality of blades is at least 5 and is the number of the plurality of blades is determined from a blade length, a solidity of the blades, and a time tip interval associated with a desired maximum tip speed of the wind rotor, wherein the time tip interval is the distance and time between two blade tips of a rotating wind turbine, and wherein the number of the plurality of rotor assemblies and stator assemblies is determined from the torque producible by the plurality of blades and the desired maximum tip speed.

15. A wind turbine according to claim 14, wherein the wind turbine has a cut-in speed of less than 5 mph (2.2 m/s).

16. A wind turbine according to claim 14, wherein the number of the plurality of blades is greater than 5.

17. A wind turbine according to claim 14, wherein the permanent magnet generator is an axial type generator.

18. A wind turbine according to claim 14, wherein the permanent magnet generator is a radial generator.

19. A wind turbine according to claim 14, wherein the desired maximum tip speed is less than 100 mph.

20. A wind turbine according to claim 19, wherein the desired maximum tip speed is about 90 mph.

21. A wind turbine according to claim 14, wherein at 75 rpm, an output of the permanent magnet generator is at least 10 kW peak power at less than 17 mph wind speed.

22. A wind turbine according to claim 14, further including a variable pitch system.

\* \* \* \* \*